United States Patent
Kondo et al.

(10) Patent No.: US 10,514,947 B2
(45) Date of Patent: Dec. 24, 2019

(54) CONTAINER MANAGEMENT APPARATUS, CONTAINER MANAGEMENT METHOD, AND NONVOLATILE RECORDING MEDIUM

(71) Applicant: HITACHI, LTD., Tokyo (JP)

(72) Inventors: Ryosuke Kondo, Tokyo (JP); Shinji Osako, Tokyo (JP); Akihisa Nagami, Tokyo (JP); Hiroshi Yamakawa, Tokyo (JP); Keisuke Matsumoto, Tokyo (JP); Kenji Ozoe, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/127,430

(22) Filed: Sep. 11, 2018

(65) Prior Publication Data
US 2019/0102214 A1 Apr. 4, 2019

(30) Foreign Application Priority Data
Sep. 29, 2017 (JP) .................................. 2017-189527

(51) Int. Cl.
*G06F 9/455* (2018.01)
*G06F 9/48* (2006.01)
(Continued)

(52) U.S. Cl.
CPC ........ *G06F 9/45558* (2013.01); *G06F 3/0605* (2013.01); *G06F 3/065* (2013.01);
(Continued)

(58) Field of Classification Search
CPC .. G06F 9/455; G06F 9/45533; G06F 9/45558; G06F 2009/45562;
(Continued)

(56) References Cited

U.S. PATENT DOCUMENTS

2010/0122248 A1\* 5/2010 Robinson ................ G06F 9/485
718/1
2013/0055249 A1\* 2/2013 Vaghani ................ G06F 3/0617
718/1
(Continued)

FOREIGN PATENT DOCUMENTS

JP  2017-076264 A  4/2017
JP  2017-111761 A  6/2017

OTHER PUBLICATIONS

Japanese Office Action received in corresponding Japanese Application No. 2017-189527 dated Jul. 16, 2019.

*Primary Examiner* — Charles M Swift
(74) *Attorney, Agent, or Firm* — Mattingly & Malur, PC

(57) ABSTRACT

A host computer 30 that manages a container built on an operating system includes a processor 31. The processor 31 is configured to duplicate a second container based on a container image of a first container, and configure a hardware resource used by the first container such that the hardware resource can also be used by the second container. A nonvolatile storage device 36 of the host computer 30 stores container resource information in which the container image of the first container and the hardware resource used by the first container is associated, and the processor 31 is configured to, when duplicating the second container based on the container image of the first container, duplicate the hardware resource associated with the container image of the first container, and configure the duplicated hardware resource such that the duplicated hardware resource can be used by the second container.

20 Claims, 16 Drawing Sheets

(51) Int. Cl.
*G06F 9/50* (2006.01)
*G06F 8/61* (2018.01)
*H04L 29/08* (2006.01)
*G06F 3/06* (2006.01)

(52) U.S. Cl.
CPC ............... *G06F 3/067* (2013.01); *G06F 8/63* (2013.01); *G06F 9/455* (2013.01); *G06F 9/45533* (2013.01); *G06F 9/48* (2013.01); *G06F 9/485* (2013.01); *G06F 9/4806* (2013.01); *G06F 9/4843* (2013.01); *G06F 9/4881* (2013.01); *G06F 9/50* (2013.01); *G06F 9/5005* (2013.01); *G06F 9/5011* (2013.01); *G06F 9/5016* (2013.01); *G06F 9/5022* (2013.01); *G06F 9/5027* (2013.01); *G06F 9/5061* (2013.01); *G06F 9/5077* (2013.01); *H04L 67/1095* (2013.01); *H04L 67/1097* (2013.01); *H04L 67/34* (2013.01); *G06F 2009/45562* (2013.01); *G06F 2009/45575* (2013.01); *G06F 2009/45579* (2013.01); *G06F 2009/45583* (2013.01); *G06F 2009/45587* (2013.01)

(58) Field of Classification Search
CPC . G06F 2009/45575; G06F 2009/45583; G06F 2009/45587; G06F 9/48; G06F 9/4806; G06F 9/4843; G06F 9/485; G06F 9/4881; G06F 9/50; G06F 9/5005; G06F 9/5011; G06F 9/5016; G06F 9/5022; G06F 9/5027; G06F 9/5061
See application file for complete search history.

(56) References Cited

U.S. PATENT DOCUMENTS

| | | | | |
|---|---|---|---|---|
| 2015/0150003 | A1* | 5/2015 | Emelyanov | G06F 9/455 718/1 |
| 2016/0098285 | A1* | 4/2016 | Davis | G06F 9/45545 718/1 |
| 2017/0177860 | A1* | 6/2017 | Suarez | G06F 21/31 |
| 2017/0322824 | A1* | 11/2017 | Reuther | G06F 3/0604 |
| 2018/0157517 | A1* | 6/2018 | Dong | G06F 9/45558 |
| 2018/0189176 | A1* | 7/2018 | Jobi | G06F 9/5022 |
| 2018/0217859 | A1* | 8/2018 | Triplett | G06F 9/45558 |
| 2018/0267785 | A1* | 9/2018 | Holman | G06F 8/60 |
| 2018/0307537 | A1* | 10/2018 | Chen | G06F 9/5016 |

* cited by examiner

| Container persistent volume name (63a) | Container name (63b) | Directory name (63c) | Copy flag (63d) | Container image name (63e) | Template flag (63f) |
|---|---|---|---|---|---|
| hvol1 | rdbms_env1 | myvol | true | rdbms_env_Img1 | true |
| hvol2 | rdbms_env2 | myvol | true | rdbms_env_Img2 | true |
| hvol3 | rdbms_env3 | myvol1 | true | rdbms_env_Img3 | true |
| hvol4 | rdbms_env4 | myvol2 | false | rdbms_env_Img3 | true |
| hvol5 | rdbms_env5 | myvol | false | rdbms_env_Img5 | true |
| hvol6 | rdbms_env6 | myvol | true | rdbms_env_Img6 | true |
| hvol7 | rdbms_env7 | myvol | true | rdbms_env_Img7 | true |
| hvol8 | rdbms_env8 | myvol | true | rdbms_env_Img8 | true |
| hvol9 | rdbms_env9 | myvol | true | rdbms_env_Img9 | true |
| hvol10 | rdbms_env10 | myvol | true | - | false |
| hvol11 | rdbms_env11 | myvol | true | - | false |
| hvol12 | rdbms_env12 | myvol | true | - | false |

FIG.4

| LDEV name | Container persistent volume name | Port name | Storage serial number |
|---|---|---|---|
| xxxxx | hvol1 | XX | 000000 |
| yyyyy | hvol2 | XX | 000000 |
| zzzzz | hvol3 | XX | 000000 |
| aaaaa | hvol4 | XX | 000000 |
| bbbbb | hvol5 | XX | 000000 |
| ccccc | hvol6 | XX | 000000 |
| ddddd | hvol7 | XX | 000000 |
| eeeee | hvol8 | XX | 000000 |
| fffff | hvol9 | XX | 000000 |
| ggggg | hvol10 | YY | 000001 |
| hhhhh | hvol11 | YY | 000001 |

| Duplication target | | Mount destination | Key (copy flag: true, container image name, template flag: true) | | |
|---|---|---|---|---|---|
| Container persistent volume name 63a | Container name 63b | Directory name 63c | Copy flag 63d | Container image name 63e | Template flag 63f |
| hvol1 | rdbms_env1 | myvol1 | true | rdbms_env_Img1 | true |
| Hvol1 | rdbms_env1 | myvol2 | false | rdbms_env_Img1 | true |

(B)

| LDEV name 64a | Container persistent volume name 64b | Port name 64c |
|---|---|---|
| xxxxx | hvol1 | XX |
| yyyyy | hvolxx | YY |

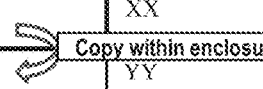
Copy within enclosure (C)

| Container persistent volume name | Container name | Directory name | Copy flag | Container image name | Template flag |
|---|---|---|---|---|---|
| hvol1 | rdbms_env1 | myvol1 | true | rdbms_env_Img1 | true |
| Hvol1 | rdbms_env1 | myvol2 | false | rdbms_env_Img1 | true |
| hvolxx | rdbms_env2 | myvol1 | true | | false |

⇐ Insert (D)

Key (copy flag: false, container image name, template flag: true)

| Container persistent volume name | Container name | Directory name | Copy flag | Container image name | Template flag |
|---|---|---|---|---|---|
| hvol1 | rdbms_env1 | myvol1 | true | rdbms_env_Img1 | true |
| Hvol1 | rdbms_env1 | myvol2 | false | rdbms_env_Img1 | true |
| hvolxx | rdbms_env2 | myvol1 | true | - | false |
| Hvol1 | rdbms_env2 | myvol2 | false | - | false |

⇐ Insert

| Duplication target | Key (container name) | Mount destination | Key (copy flag: true) | | Key (template flag: true) |
|---|---|---|---|---|---|
| Container persistent volume name 63a | Container name 63b | Directory name 63c | Copy flag 63d | Container image name 63e | Template flag 63f |
| hvol1 | rdbms_env1 | myvol1 | true | rdbms_env_Img1 | true |
| Hvol1 | rdbms_env1 | myvol2 | false | rdbms_env_Img1 | true |

63

(B)

| LDEV name | Container persistent volume name | Port |
|---|---|---|
| xxxxx | hvol1 | XX |
| yyyyy | hvolxx | YY |

64

Copy within enclosure (C)

| Container persistent volume name | Container name | Directory name | Copy flag | Container image name | Template flag |
|---|---|---|---|---|---|
| hvol1 | rdbms_env1 | myvol1 | true | rdbms_env_Img1 | true |
| Hvol1 | rdbms_env1 | myvol2 | false | rdbms_env_Img1 | true |
| hvolxx | rdbms_env2 | myvol1 | true | - | false |

63

Reflect volume duplication

⇐ Insert (D)

| | Key (container name) | | Key (copy flag: true) | | Key (template flag: true) |
|---|---|---|---|---|---|
| Container persistent volume name | Container name | Directory name | Copy flag | Container image name | Template flag |
| hvol1 | rdbms_env1 | myvol1 | true | rdbms_env_Img1 | true |
| Hvol1 | rdbms_env1 | myvol2 | false | rdbms_env_Img1 | true |
| hvolxx | rdbms_env2 | myvol1 | true | - | false |
| Hvol1 | rdbms_env2 | myvol2 | false | - | false |

63

Attach volume without duplicating volume

⇐ Insert

FIG.17

CONTAINER MANAGEMENT APPARATUS, CONTAINER MANAGEMENT METHOD, AND NONVOLATILE RECORDING MEDIUM

CROSS-REFERENCE TO PRIOR APPLICATION

This application relates to and claims the benefit of priority from Japanese Patent Application No. 2017-189527 filed on Sep. 29, 2017, the entire disclosure of which is incorporated herein by reference.

BACKGROUND

The present invention relates to a container management apparatus and the like for managing a container that is an environment in which an application is executed.

DevOps is known as a program development method for the purpose of prompt implementation from development to provision of an application. For a technology supporting DevOps, containerization technology is widely used. The containerization technology is a technology for virtualizing an application layer, on a shared OS layer. According to the containerization technology, it is possible to deploy an application development and/or test environment more promptly with less overhead than VM (Virtual Machine), which virtualizes hardware and/or devices including OS. Typical container engine products for implementing the containerization technology include Docker® of Docker, Inc.

In a container built on a host computer, only differences from shared OS information are managed. If a container is deleted, data in the container is not maintained. To avoid this, Docker provides "data volume" as a function. A data volume is created on a host OS where Docker is running, the data volume is mounted to a container, and data is stored in the data volume from the container, whereby the data can be persisted. Such a data volume can also be created on a storage apparatus by using "plugin" provided by Docker, Inc.

In Docker, "Docker image" is required when a container is deployed. A Docker image is an image file in which information on an environment of a container required for deployment is collected. There are two types of Docker image, namely, Docker images provided by, for example, Docker, Inc. and Docker images created by users from existing containers. A Docker image is created by imaging a container of which environment is configured by a user. From that Docker image, multiple containers with similar environments can be instantly deployed. However, a Docker image does not include hardware information of a container. Accordingly, if a Docker image is created from a container to which a data volume is attached, the Docker image does not include information on the data volume, but only includes information on differences respect to an application from OS information of the container.

Moreover, recently, Oracle Corporation has begun distributing a Docker image for an environment of Oracle® DB, which is an example of RDBMS, and the use of RDBMS on a container is becoming widespread.

For example, among technologies related to containers, a technology for facilitating access to a file in a file system on a virtual file container instance is known (for example, see Japanese Patent Laid-Open No. 2017-76264).

SUMMARY

For example, RDBMS deployed on multiple containers cannot use a same data volume. Therefore, when duplicating a container on which RDBMS is deployed, it is necessary to also duplicate a data volume.

For example, in case of duplicating a container on which RDBMS is deployed, a manager needs to perform the following three processes: (1) creating a copy of a data volume mounted to a duplication source container, (2) creating a Docker image from the duplication source container, and deploying a duplication destination container from the Docker image, and (3) attaching the copy of the data volume to the duplication destination container. This arouses concerns about occurrence of human errors and an increase in man-hours taken by the manager. In proportion to the number of containers duplicated, the probability of occurrence of human errors increases, and man-hours taken by the manger also increases.

The present invention is made in light of the above-described circumstances, and an object of the present invention is to provide a technique enabling easy and appropriate management of a container.

To achieve the above object, a container management apparatus according to an aspect is a container management apparatus that manages a container built on an operating system, wherein the container management apparatus includes a processor unit, and the processor unit is configured to duplicate a second container based on a container image of a first container, and configure a hardware resource used by the first container such that the hardware resource can also be used by the second container.

According to the present invention, a container can be easily and appropriately managed.

BRIEF DESCRIPTION OF THE DRAWINGS

FIG. 4 is a schematic diagram of a container persistent volume management table according to the embodiment;

FIG. 5 is a schematic diagram of a storage volume management table according to the embodiment;

FIG. 15 is a diagram for explaining states of the various types of tables in the first duplication destination container deployment processing according to the embodiment;

FIG. 17 is a diagram for explaining states of the various types of tables in the second duplication destination container deployment processing according to the embodiment;

DETAILED DESCRIPTION OF THE EMBODIMENT

An embodiment will be described with reference to drawings. Note that the embodiment described below is not intended to limit inventions according to claims, and that all of the various elements and all of the combinations of such elements described in the embodiment are not necessarily essential for the solution of the present invention.

In the following description, information is expressed as "AAA table" when the information is explained, in some cases. However, information may be expressed using any data structure. That is, to show that information is not dependent on data structures, "AAA table" can be read as "AAA information".

Moreover, in the following description, a "processor unit" includes one or more processors. At least one processor is typically a microprocessor such as CPU (Central Processing Unit). Each of the one or more processors may be a single-core processor or may be a multi-core processor. The processor may include a hardware circuit configured to perform partial or whole processing.

Furthermore, partial or whole processing to be performed by the processor may be performed by a hardware circuit. Programs to be executed by the processor may be installed from a program source. The program source may be a program distribution server or a storage (recording) medium (for example, a portable storage (recording) medium).

Figure 1:
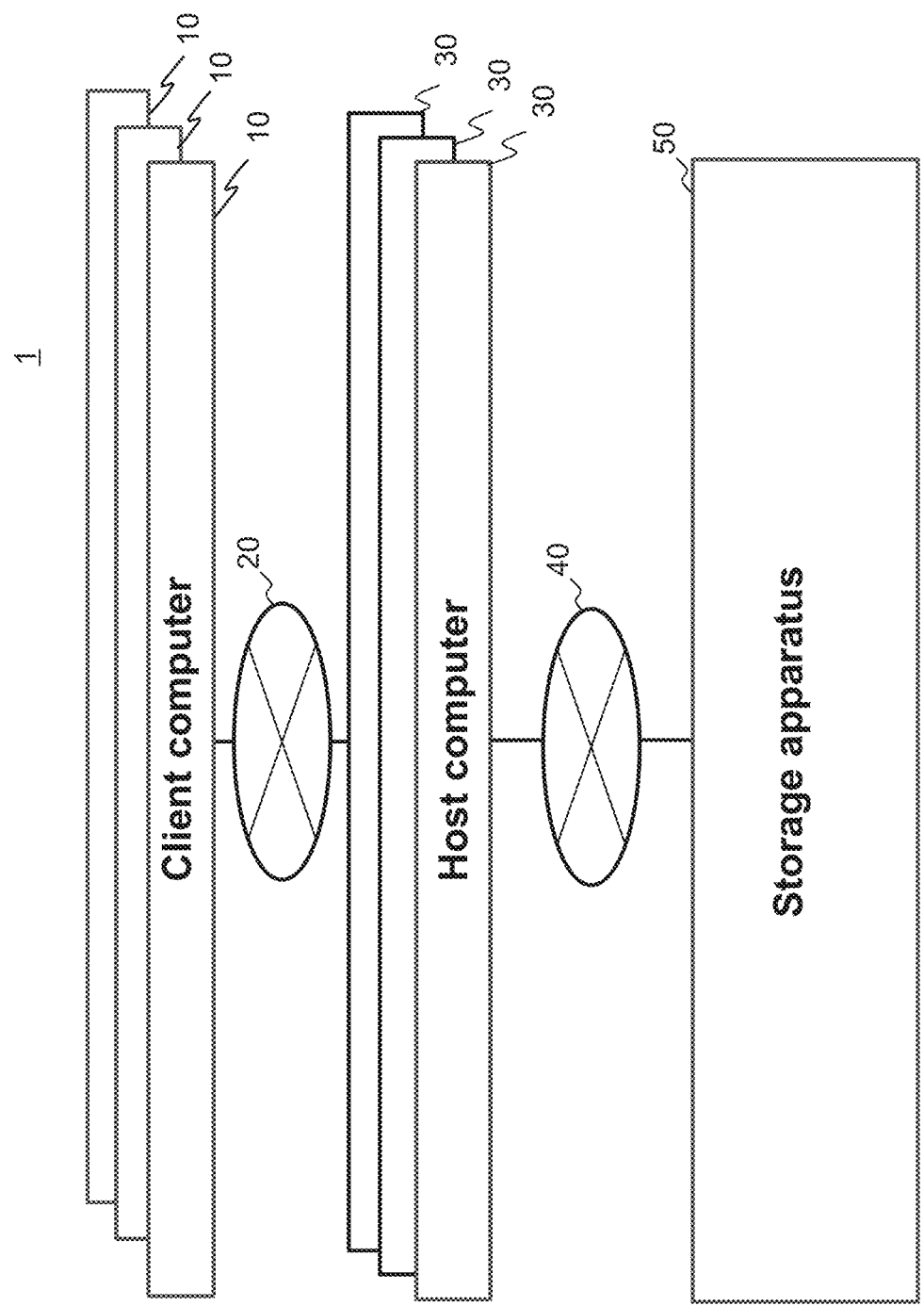
FIG. 1 is a diagram of an entire configuration of a computer system according to an embodiment.

FIG. 1 is a diagram of an entire configuration of a computer system according to the embodiment.

The computer system 1 includes one or more client computers 10, one or more host computers 30, and a storage apparatus 50. The client computer 10 is coupled to the host computer 30 via a LAN (Local Area Network) 20 as an example of a network. Moreover, the host computer 30 is coupled to the storage apparatus 50 via a SAN (Storage Area Network) as an example of a network.

The client computer 10 is configured by, for example, a PC (Personal Computer) and is used to accept from a user various commands and the like for managing a container provided by the host computer 30. The host computer 30 builds and provides one or more containers for performing predetermined processing. Moreover, the host computer 30 performs various types of processing for managing a container. The storage apparatus 50 stores various types of information. For example, the storage apparatus 50 stores a persistent volume to be used by a container and performs processing such as duplication of the persistent volume within the storage apparatus 50.

Figure 2:
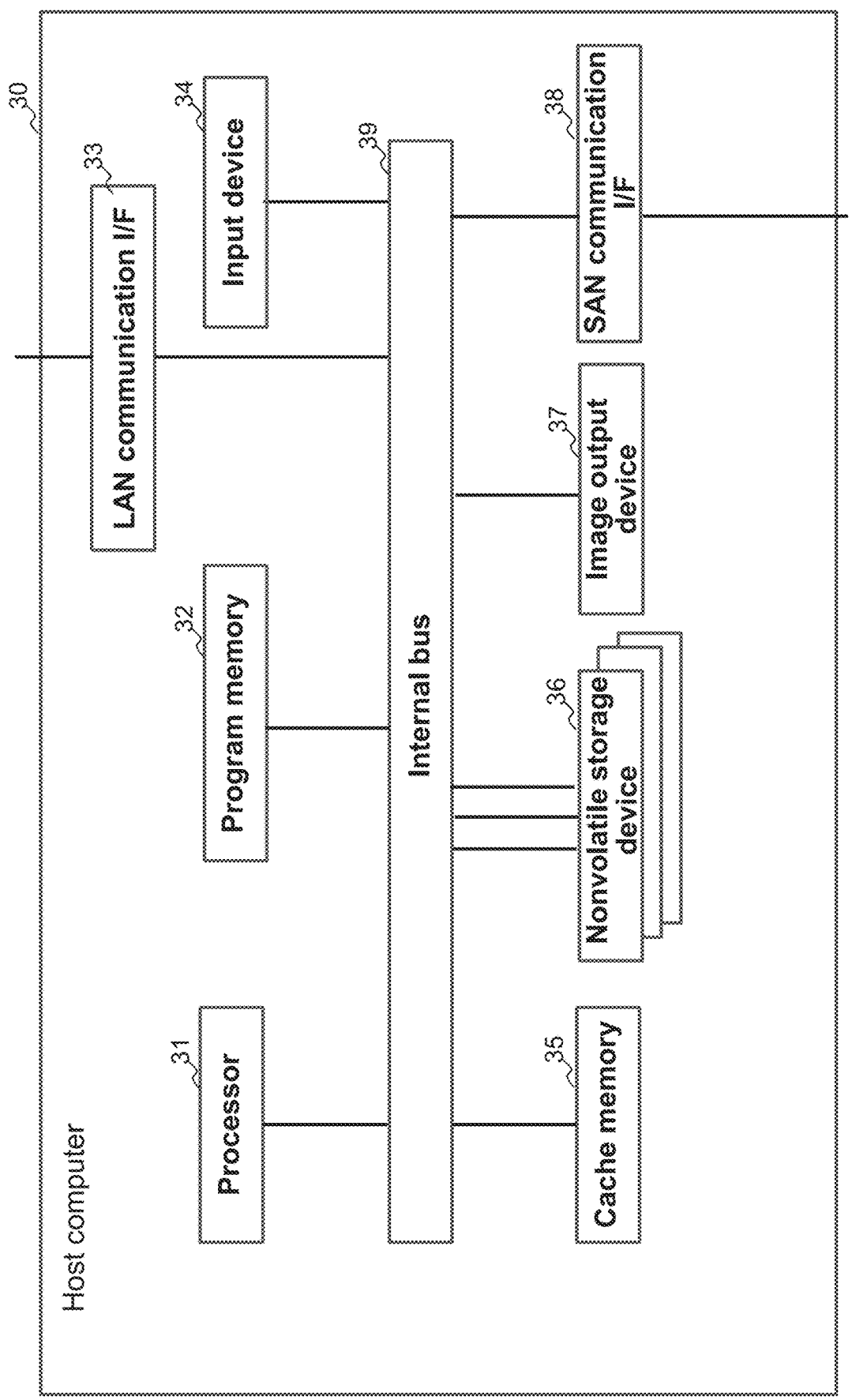
FIG. 2 is a schematic diagram of a host computer according to the embodiment.

FIG. 2 is a schematic diagram of a host computer according to the embodiment.

The host computer 30 includes a processor 31 as an example of control means, a program memory 32, a LAN communication I/F (interface) 33, an input device 34, a cache memory 35, a nonvolatile storage device 36 as an example of a storage unit, an image output device 37, and a SAN communication I/F (interface) 38. The constituent units (31 to 38) of the host computer 30 are communicably coupled to each other via an internal bus 39.

The processor 31 performs various types of processing by executing a program read from the nonvolatile storage device 36 into the program memory 32. The program memory 32 is, for example, a RAM (Random Access Memory) and stores a program to be executed by the processor 31. The LAN communication I/F 33 is an interface such as, for example, a wired LAN card or a wireless LAN card, and communicates with another apparatus (for example, the client computer 10) via the LAN 20.

The input device 34 is, for example, a mouse, a key board, or the like and receives various inputs from a manager of the host computer 30. The cache memory 35 temporarily stores data to be used by the processor 31 in processing, data to be written into the storage apparatus 50, data read from the storage apparatus 50, and the like. The nonvolatile storage device 36 is, for example, a nonvolatile storage device capable of storing information over a relatively long time period, such as a hard disk or a flash memory, and stores programs to be executed by the processor 31 and various data (for example, a table and the like) to be used in processing executed by the processor 31 in processing. The image output device 37 is, for example, a liquid crystal display and outputs and displays various types of information. The SAN communication I/F 38 is an interface for communicating with the storage apparatus 50 via the SAN 40.

Figure 3:
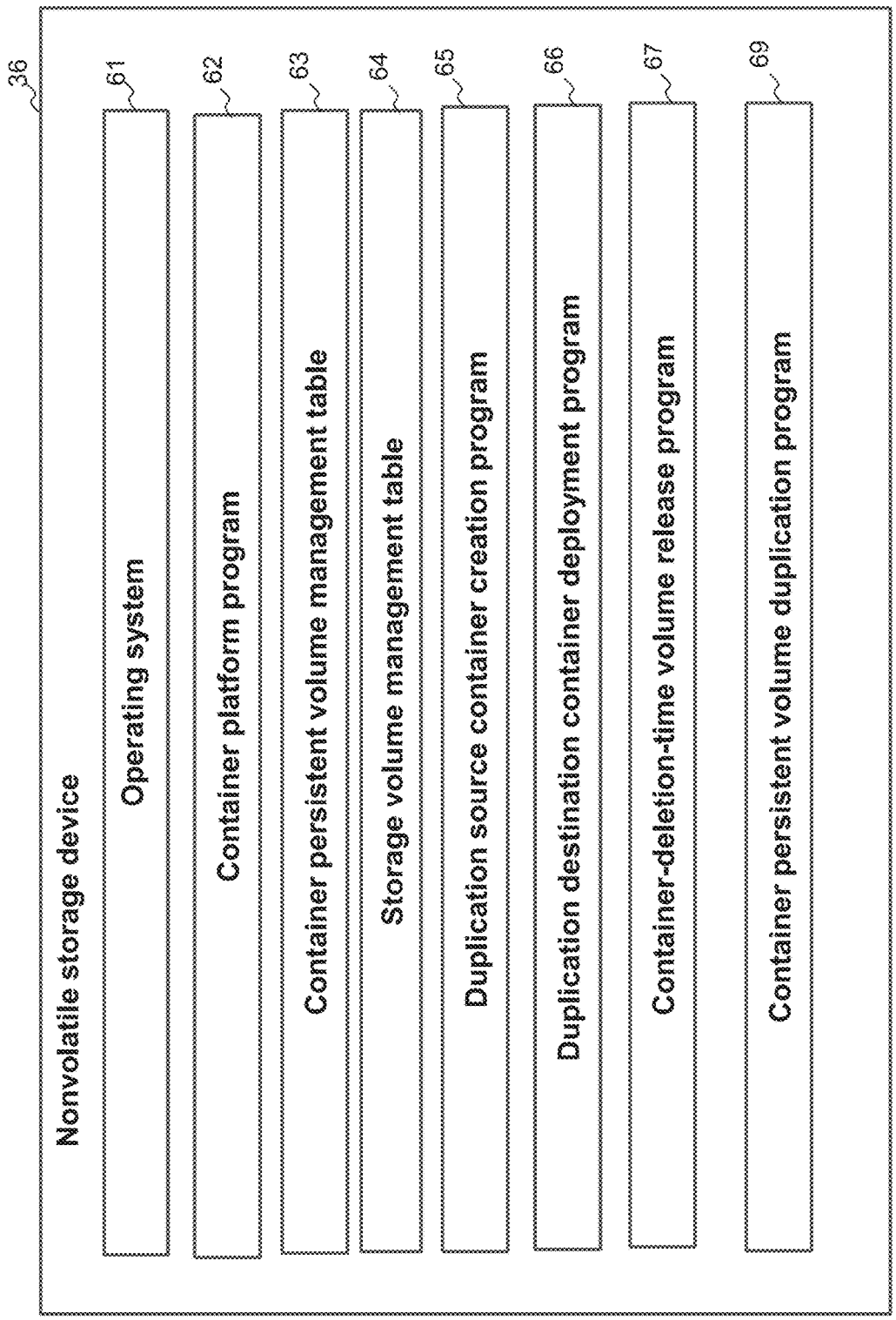
FIG. 3 is a schematic diagram of a nonvolatile storage device according to the embodiment.

FIG. 3 is a schematic diagram of the nonvolatile storage device according to the embodiment.

The nonvolatile storage device 36 stores, as programs, an operating system (OS) 61, a container platform program 62, a duplication source container creation program 65, a duplication destination container deployment program 66, a container-deletion-time volume release program 67, and a container persistent volume duplication program 69. The operating system 61 is executed by the processor 31, thereby performing processing for controlling program execution on the host computer 30, and other processing. The container platform program 62 is executed by the processor 31, thereby performing basic management processing for managing one or more containers built on the OS 61. For example, the container platform program 62 can be generated based on a program of Docker® Engine. The other programs 65 to 70 will be described later. In the present embodiment, the container platform program 62, the duplication source container creation program 65, the duplication destination container deployment program 66, the container-deletion-time volume release program 67, and the container persistent volume duplication program 69 correspond to container management program. Note that the container management program may not include part of programs among the container platform program 62, the duplication source container creation program 65, the duplication destination container deployment program 66, the container-deletion-time volume release program 67, and the container persistent volume duplication program 69.

Moreover, the nonvolatile storage device 36 stores, as data to be used in processing, a container persistent volume management table 63 and a storage volume management table 64. The container persistent volume management table 63 and the storage volume management table 64 are referenced by multiple host computers 30. The duplication source container creation program 65, the duplication destination container deployment program 66, the container-deletion-time volume release program 67, and the container persistent volume duplication program 69 update the container persistent volume management table 63 and the storage volume management table 64 via the network.

FIG. 4 is a schematic diagram of the container persistent volume management table according to the embodiment.

The container persistent volume management table 63 is an example of container resource information indicating an association between a persistent volume, which is an example of a hardware resource used by a container, and a container image of the container. In the container persistent volume management table 63, each row (record) includes fields of a container persistent volume name 63a, a container name 63b, a directory name 63c, a copy flag 63d, a container image name 63e, and a template flag 63f.

In the container persistent volume name 63a, a name of a persistent volume used by a container (a container persistent volume name) is stored. In the container name 63b, a name of the container (a container name) that uses the persistent volume corresponding to the row (the persistent volume corresponding to the container persistent volume name in the container persistent volume name 63a of the row) is stored. In the directory name 63c, a name of a directory (a directory name) in which the persistent volume corresponding to the row is mounted is stored. In the copy flag 63d, information indicating whether or not the persistent volume corresponding to the row needs to be copied (duplicated) when the persistent volume is used by another container is stored. In the present embodiment, "true" is set in the copy flag 63d if a persistent volume needs to be copied when the persistent volume is used by another container, and "false" is set if a persistent volume does not need to be copied when the persistent volume is used by another container, for example, if a persistent volume can be shared among multiple containers. For example, in case where the container persistent volume is a volume storing data of RDBMS, "true" is set in the copy flag 63d if consistency of the data of RDBMS needs to be maintained.

In the container image name 63e, a name of a container image (a container image name) of the container corresponding to the row (the container corresponding to the container name in the container name 63b of the row) is stored. Note that if a container image of the container corresponding to the row is not created, the container image name 63e is blank. In the template flag 63f, information indicating whether or not the container image corresponding to the row (the container image corresponding to the container image name in the container image name 63e of the row) can be used as a template when another container is deployed is stored. For example, "true" is set in the template flag 63f if the container image corresponding to the row can be used as a template, and "false" is set if the container image corresponding to the row cannot be used as a template.

FIG. 5 is a schematic diagram of the storage volume management table according to the embodiment.

The storage volume management table 64 is a table to manage a LDEV (logical device) in the storage apparatus 50 in which a persistent volume is stored, and stores a row (record) for each persistent volume. Each row of the storage volume management table 64 includes fields of LDEV name 64a, a container persistent volume name 64b, a port name 64c, and a storage serial number 64d.

In the LDEV name 64a, a name of a LDEV (a LDEV name) that stores a persistent volume corresponding to the row is stored. In the container persistent volume name 64b, a container persistent volume name of the persistent volume corresponding to the row is stored. In the port name 64c, a name of a port (a port name) to be used when access is made to the LDEV corresponding to the row is stored. In the storage serial number 64d, a serial number of the storage apparatus 50 (a storage serial number) is stored.

Figure 6:
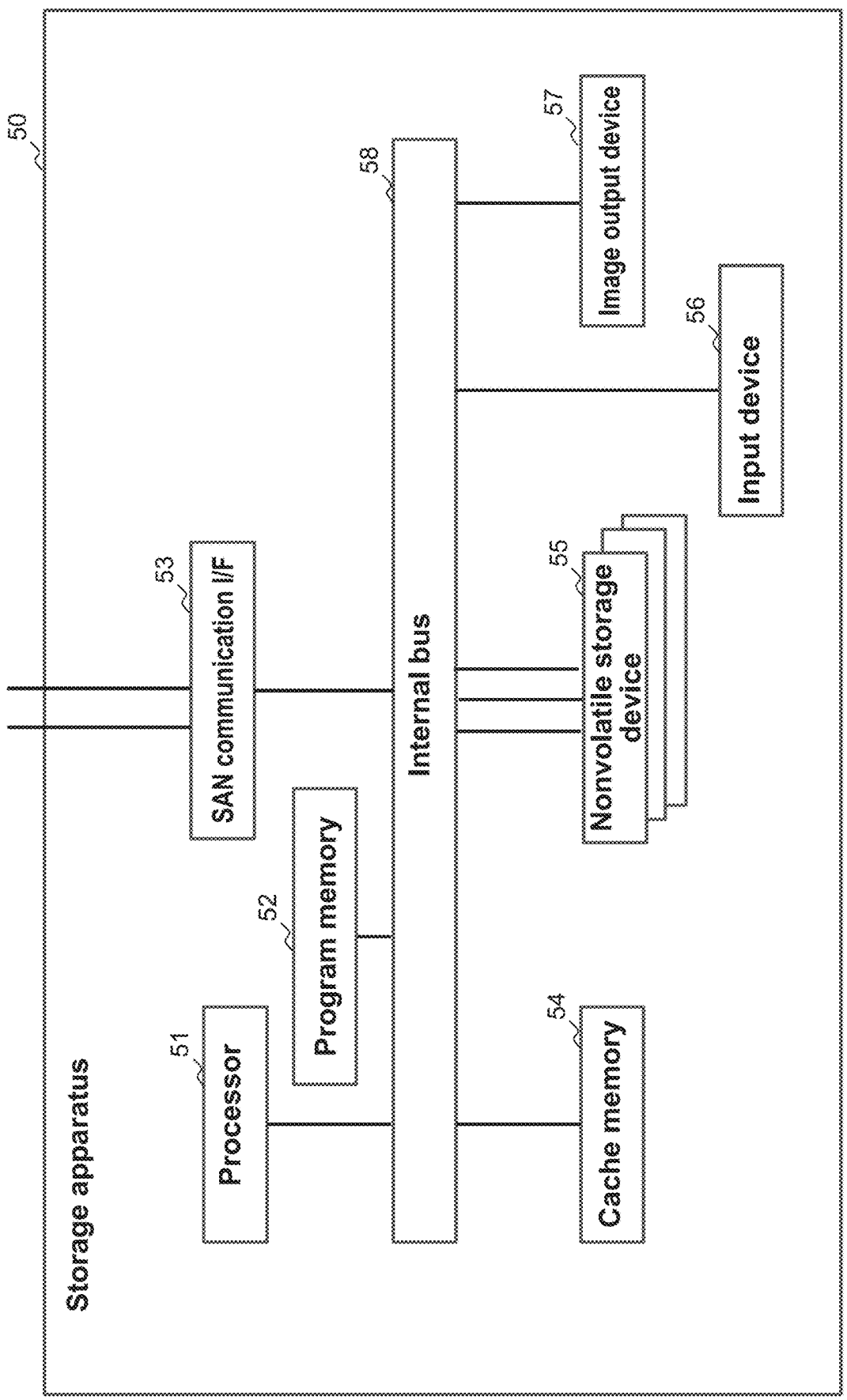
FIG. 6 is a schematic diagram of a storage apparatus according to the embodiment.

FIG. 6 is a schematic diagram of the storage apparatus according to the embodiment.

The storage apparatus 50 includes a processor 51, a program memory 52, a SAN communication I/F 53, a cache memory 54, a nonvolatile storage device 55, an input device 56, and an image output device 57. The constituent units (51 to 57) of the storage apparatus 50 are communicably coupled to each other via an internal bus 58.

The processor 51 performs various types of processing by executing a program read from the nonvolatile storage device 55 into the program memory 52. The various types of processing performed by the processor 51 include intra-enclosure copying processing in which a duplication target LDEV name and a port name are received from the host computer 30 and a corresponding LDEV is duplicated. The program memory 52 is, for example, a RAM (Random Access Memory) and stores a program (an intra-enclosure copying program for execution of the intra-enclosure copying processing, or the like) to be executed by the processor 51. The SAN communication I/F 53 is an interface for communicating with the host computer 30 via the SAN 40.

The cache memory 54 temporarily stores data to be used by the processor 51 in processing, data to be sent to the host computer 30, data received from the host computer 30, and the like. The nonvolatile storage device 55 is a nonvolatile storage device capable of storing information over a relatively long time period, such as, for example, a hard disk or a flash memory, and stores programs to be executed by the processor 51 and various data to be used in processing executed by the processor 51. The input device 56 is, for example, a mouse, a key board, or the like and receives various inputs from a manager of the storage apparatus 50. The image output device 57 is, for example, a liquid crystal display and outputs and displays various types of information.

Next, processing operations in the computer system 1 will be described.

First, first duplication source container creation main processing will be described. The first duplication source container creation main processing is processing from creating a container image of a duplication source container (a first container), up to registering a row relevant to the container image in the container persistent volume management table 63.

Figures 7, 8:
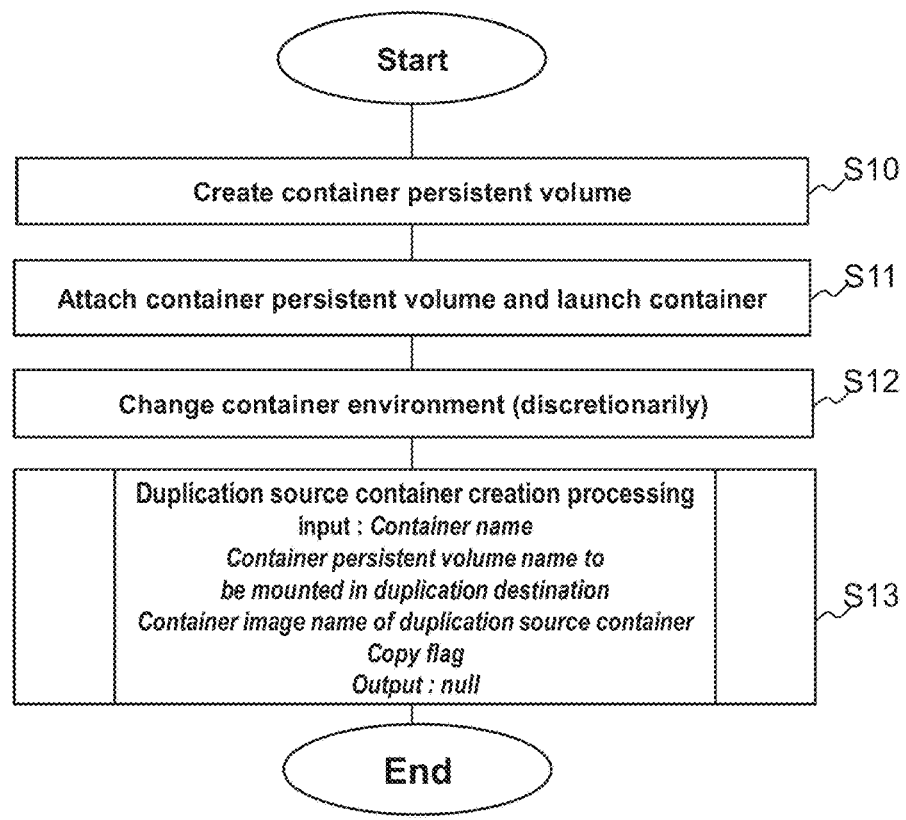
FIG. 7 is a flowchart of first duplication source container creation main processing according to the embodiment.
FIG. 8 is a diagram for explaining a state of the container persistent volume management table by the first duplication source container creation main processing according to the embodiment.

FIG. 7 is a flowchart of the first duplication source container creation main processing according to the embodiment. FIG. 8 is a diagram for explaining a state of the container persistent volume management table by the first duplication source container creation main processing according to the embodiment.

When the processor 31 executing the container platform program 62 receives a command to create a container persistent volume and launch a container from the client computer 10, the processor 31 first creates a container persistent volume corresponding to the command (step S10). Here, for the command received from the client computer 10, for example, the following commands (1) and (2) can be made in case where a program based on Docker Engine is used as the container platform program 62.

```
-docker volume create (to-be-created volume name)-
    driver=(to-be-used driver name)-opt capa=(vol-
    ume capacity)                                         (1)

-docker run-v (to-be-mounted volume name (here,
    to-be-created volume name)): (container mount
    destination) (designated container image name)        (2)
```

The command (1) is a command requesting to create a volume under the to-be-created volume name and with the volume capacity designated by the command by using a driver corresponding to the to-be-used driver name. The command (2) is a command to launch a container, with the volume designated by the command being mounted to the designated container mount destination.

Subsequently, the processor 31 attaches the created container persistent volume to the designated mount destination and launches a container (a duplication source container) based on the container image designated by the command (step S11).

Subsequently, the processor 31 changes an environment of the launched container (step S12). Note that the changing the environment of the container may be a preconfigured environmental change, or alternatively the changing the environment may be executed by receiving a user designation from the client computer 10. Note that step S12 need not necessarily be performed.

Subsequently, the processor 31 performs duplication source container creation processing (step S13: see FIG. 13) by executing the duplication source container creation program 65. Note that in the duplication source container creation processing, processing is performed by inputting a container name of the created container, a container persistent volume name to be mounted in a duplication destination (the container persistent volume name attached to the duplication source container), the container image name for the duplication source container, and a copy flag (a set value thereof). Note that the duplication source container creation processing will be described later.

Through the first duplication source container creation main processing, the container persistent volume management table 63 is changed from a state shown in an upper diagram of FIG. 8 to a state shown in a lower diagram of FIG. 8. That is, a row is added in which the following items are configured: namely, the container persistent volume name of the container persistent volume mounted in the duplication source container; the container name of the duplication source container; a directory in which the container persistent volume is mounted; a set value of the copy flag; the container image name for the duplication source container; and a set value of the template flag.

Next, second duplication source container creation main processing will be described. The second duplication source container creation main processing is processing from launching a duplication destination container by using a container image of a duplication source container as a template if the duplication source container is already launched and a container persistent volume used by this duplication source container is registered in the container persistent volume management table 63, up to registering a container persistent volume corresponding to a next duplication source container in the container persistent volume management table 63 if the launched duplication destination container is used for the next duplication source container.

Figures 9, 10:
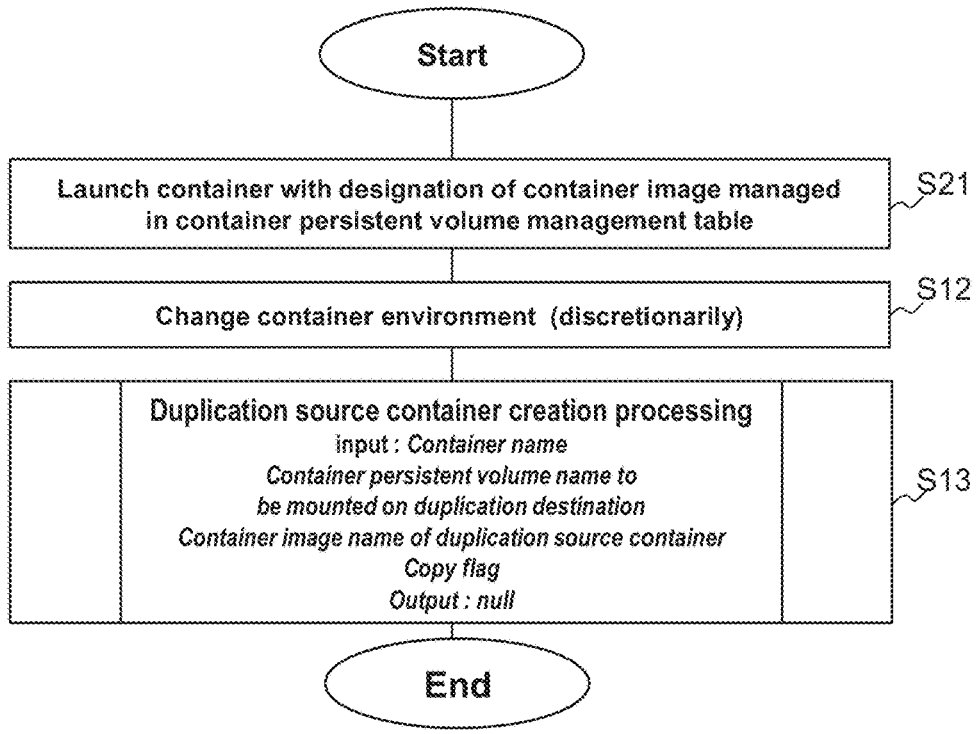
FIG. 9 is a flowchart of second duplication source container creation main processing according to the embodiment.
FIG. 10 is a diagram for explaining a state of the container persistent volume management table by the second duplication source container creation main processing according to the embodiment.

FIG. 9 is a flowchart of the second duplication source container creation main processing according to the embodiment. FIG. 10 is a diagram for explaining a state of the container persistent volume management table by the second duplication source container creation main processing according to the embodiment.

When the processor 31 executing the container platform program 62 receives a command including a designation of a container image managed in the container persistent volume management table 63 from the client computer 10, the processor 31 launches a container (a duplication source container) by using the designated container image (step S21).

Subsequently, the processor 31 changes an environment of the launched container (step S12). Note that the changing environment of the container may be a preconfigured environmental change, or alternatively the changing environment may be executed by receiving a user designation from the client computer 10. Note that step S12 need not necessarily be performed.

Subsequently, the processor 31 performs duplication source container creation processing (step S13: see FIG. 13) by executing the duplication source container creation program 65. Note that in the duplication source container creation processing, processing is performed by inputting a container name of the duplication source container, a container persistent volume name to be mounted in a duplication destination (the container persistent volume name attached to the duplication source container), the container image name for the duplication source container, and a copy flag (a set value thereof). Note that the duplication source container creation processing will be described later.

Here, when a container is duplicated with designation of a container image managed in the container persistent volume management table 63, in a row corresponding to the container at that time, a blank is set in the container image name 63e and "false" is set in the template flag 63f, as shown at a second row in an upper diagram of FIG. 10. Note that processing for making the configuration as in the upper diagram of FIG. 10 will be described in duplication destination container deployment processing shown in FIGS. 14 and 16, which will be described later.

In this state, when the second duplication source container creation main processing is performed, the container persistent volume management table 63 is changed to a state shown in a lower diagram of FIG. 10. That is, when the second duplication source container creation main processing is performed, a container image of the duplication source container is created, a container image name of the created container image is set in the container image name 63e in a corresponding row of the container persistent volume management table 63, and "true" indicating that the created container image can be used as a template is set in the template flag 63f.

Next, third duplication source container creation main processing will be described. The third duplication source container creation main processing is processing up to registering a container image of a duplication source container in the container persistent volume management table 63 when the container persistent volume management table 63 already has a registered container image name that is same as a container image name designated as a container image name of the container image of the duplication source container.

Figure 11:
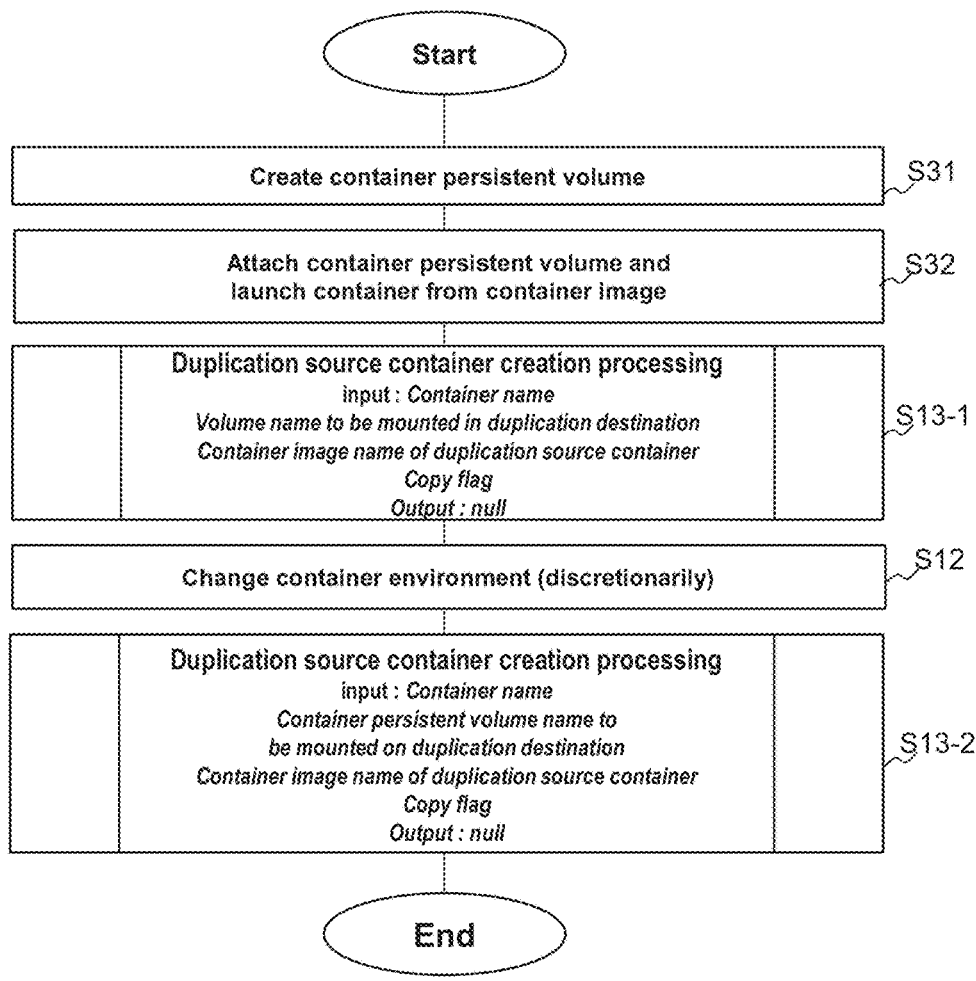
FIG. 11 is a flowchart of third duplication source container creation main processing according to the embodiment.
Figure 12:
FIG. 12 is a diagram for explaining a state of the container persistent volume management table by the third duplication source container creation main processing according to the embodiment.

FIG. 11 is a flowchart of the third duplication source container creation main processing according to the embodiment. FIG. 12 is a diagram for explaining a state of the container persistent volume management table by the third duplication source container creation main processing according to the embodiment.

When the processor 31 executing the container platform program 62 receives a command to create a container persistent volume and launch a container from the client computer 10, the processor 31 first creates a container persistent volume according to the command (step S31).

Subsequently, the processor 31 attaches the created container persistent volume to a designated mount destination and launches a container (a duplication source container) based on a designated container image (step S32).

Subsequently, the processor 31 performs duplication source container creation processing (step S13-1: see FIG. 13) by executing the duplication source container creation program 65. Note that in the duplication source container creation processing, processing is performed by inputting a container name of the duplication source container, a container persistent volume name to be mounted in a duplication destination (a container persistent volume name of the container persistent volume attached to the duplication source container), the container image name for the duplication source container, and a copy flag (a set value thereof).

Subsequently, the processor 31 changes an environment of the launched container (step S12). Note that the changing environment of the container may be a preconfigured environmental change, or alternatively the changing environment may be executed by receiving a user designation from the client computer 10. Note that step S12 need not necessarily be performed.

Subsequently, the processor 31 performs duplication source container creation processing (step S13-2: see FIG. 13) by executing the duplication source container creation program 65. Note that in the duplication source container creation processing, processing is performed by inputting the container name of the duplication source container, the container persistent volume name to be mounted in the duplication destination (the container persistent volume name of the container persistent volume attached to the duplication source container), the container image name for the duplication source container (which is same as the container image name inputted in step S13-1), and the copy flag (the set value thereof). In step S13-2, when it happens that a container image with a same name as an existing name is registered in the container persistent volume management table 63, the processor 31 performs selective processing, depending on a selection received from a user, of either (1) discarding a previous template or (2) keeping a previous template and storing a new template under a different name.

Here, after the processing in step S13-1 is performed, the container persistent volume management table 63 has an additional row corresponding to the duplication source container, as shown in an upper diagram of FIG. 12. Thereafter, when the processing in step S13-2 is performed, in which the user selects to discard the previous template, the row corresponding to the previous container is excluded from templates (the template flag 63*f* is set to "false"), and a row corresponding to the new duplication source container is added as a template (the template flag 63*f* is set to "true") in the container persistent volume management table 63 as shown in a lower diagram of FIG. 12.

Next, the duplication source container creation processing will be described in more detail.

Figure 13:
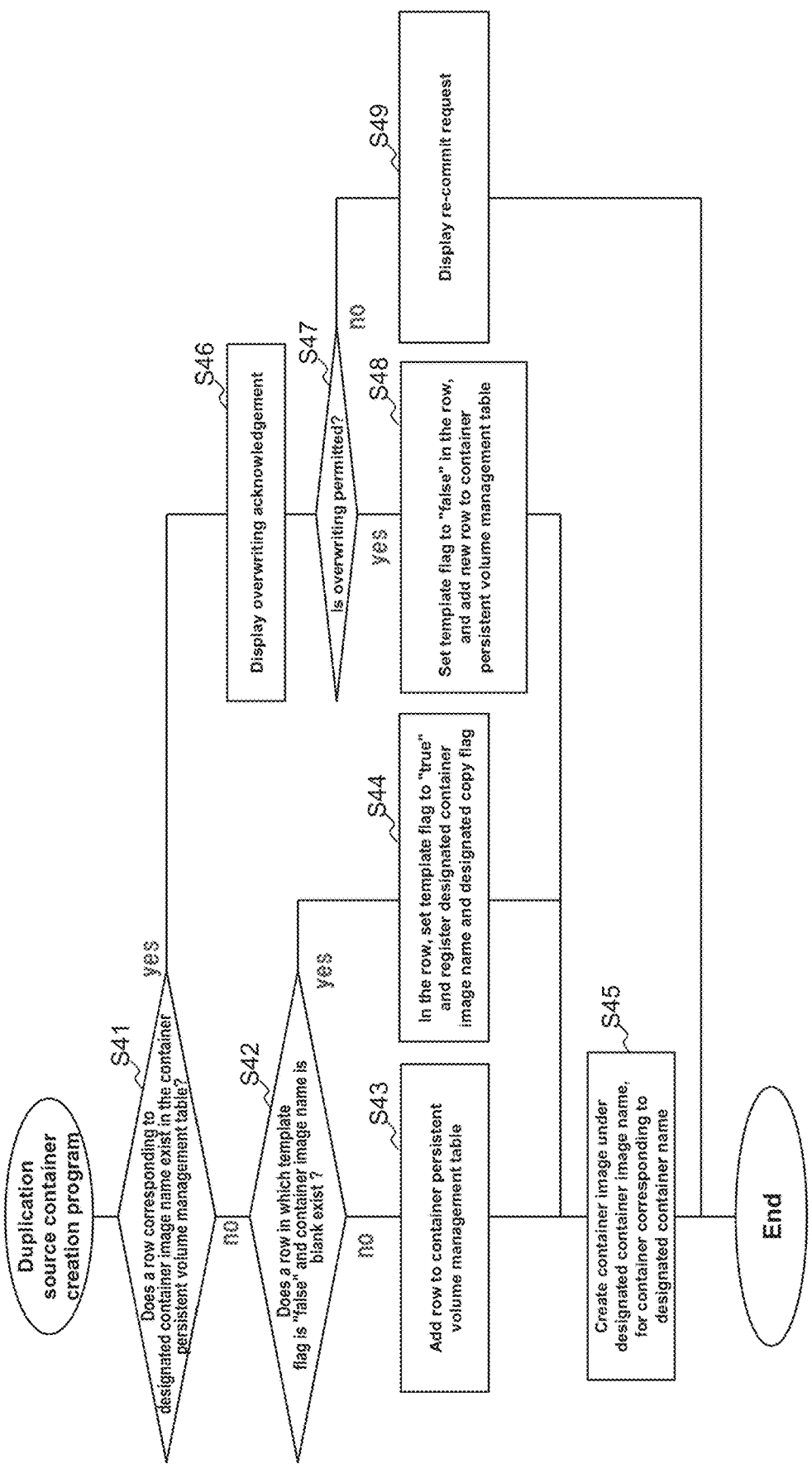
FIG. 13 is a flowchart of duplication source container creation processing according to the embodiment.

FIG. 13 is a flowchart of the duplication source container creation processing according to the embodiment.

The duplication source container creation processing is processing corresponding to step S13, step S13-1, and step S13-2 in FIGS. 7, 9, and 11, and is implemented by the processor 31 executing the duplication source container creation program 65.

The processor 31 executing the duplication source container creation program 65 determines whether or not a row corresponding to a designated container image name (an inputted container image name) exists in the container persistent volume management table 63 (step S41).

As a result, if it is determined that a row corresponding to a designated container image name does not exist in the container persistent volume management table 63 (step S41: no), the processor 31 determines whether or not a row corresponding to a designated container name in which the template flag (a set value of the template flag 63*f*) is "false" and the container image name (a set value of the container image name 63*e*) is blank exists in the container persistent volume management table 63 (step S42).

As a result, if the row corresponding to a designated container name in which the template flag is "false" and the container image name is blank does not exist in the container persistent volume management table 63 (step S42: no), the processor 31 adds a row corresponding to the designated container name and including the designated container image name to the container persistent volume management table 63 (step S43), and proceeds the processing to step S45. More specifically, in step S43, the processor 31 adds to the container persistent volume management table 63 a row including an inputted container name, a container persistent volume name to be mounted in a duplication destination, a container image name for a duplication source container, and a set value of the copy flag, with the template flag set to "true". In this event, if there are multiple container persistent volumes to be mounted to the duplication destination, the processor 31 adds rows corresponding to the multiple container persistent volumes, respectively. Note that step S43 is performed in the case shown in the flowchart of the first duplication source container creation main processing of FIG. 7.

On the other hand, if the line corresponding to a designated container name in which the template flag is "false" and the container image name is blank exists in the container persistent volume management table 63 (step S42: yes), the processor 31, in that row (the corresponding row), sets the template flag to "true", configures the container image name 63*e* to be the designated container image name, and configures the copy flag 63*d* to be a designated copy flag (step S44), and proceeds the proceeding to step S45. Note that step S44 is performed in the case shown in the flowchart of the second duplication source container creation main processing of FIG. 9.

On the other hand, in step S41, if it is determined that the line corresponding to a designated container image name exists in the container persistent volume management table 63 (step S41: yes), the processor 31 causes a display of the client computer 10 or the host computer 30 concerned to display an overwriting acknowledgement message (step S46). For example, the overwriting acknowledgement message may be as follows: "This container image name is already used as a template. Do you acknowledge overwriting this container image name?"

Subsequently, the processor 31 determines whether or not a response to the overwriting acknowledgement from a user of the client computer 10 or the host computer 30 is to permit overwriting (step S47).

As a result, if the response is to permit overwriting (step S47: yes), the processor 31 sets the template flag in the corresponding row to "false", adds a new row corresponding to the designated container image name (step S48), and proceeds the processing to step S45. More specifically, in step S48, the processor 31 adds to the container persistent volume management table 63 a row including the inputted container name, the container persistent volume name to be mounted to the duplication destination, the container image name for the duplication source container, and the set value of the copy flag, with the template flag set to "true". In this event, if there are multiple container persistent volumes to be mounted to the duplication destination, the processor 31 adds rows corresponding to the multiple container persistent volumes, respectively. Thus, a new template can be registered under an already existing container image name.

On the other hand, if the response is not to permit overwriting (step S47: no), the processor 31 causes the display of the client computer 10 or the host computer 30 to display a message requesting re-commitment ("commit") (step S49), and terminates the processing. Here, for example, the message requesting re-commitment may be as follows: "Processing is terminated without performing a commit. Designate another container image name and re-perform a commit." This processing can prevent a template corresponding to an already existing container image name from being overwritten.

In step S45, the processor 31 creates a container image under the designated container image name for a container corresponding to the designated container name, stores the created container image in, for example, the nonvolatile storage device 36, and terminates the processing. For example, it is also possible that a dedicated container for storing a container image is launched and a container image is stored with designation of that container, so that the container image can be accessed from another host computer 30.

Next, first duplication destination container deployment processing will be described.

Figure 14:
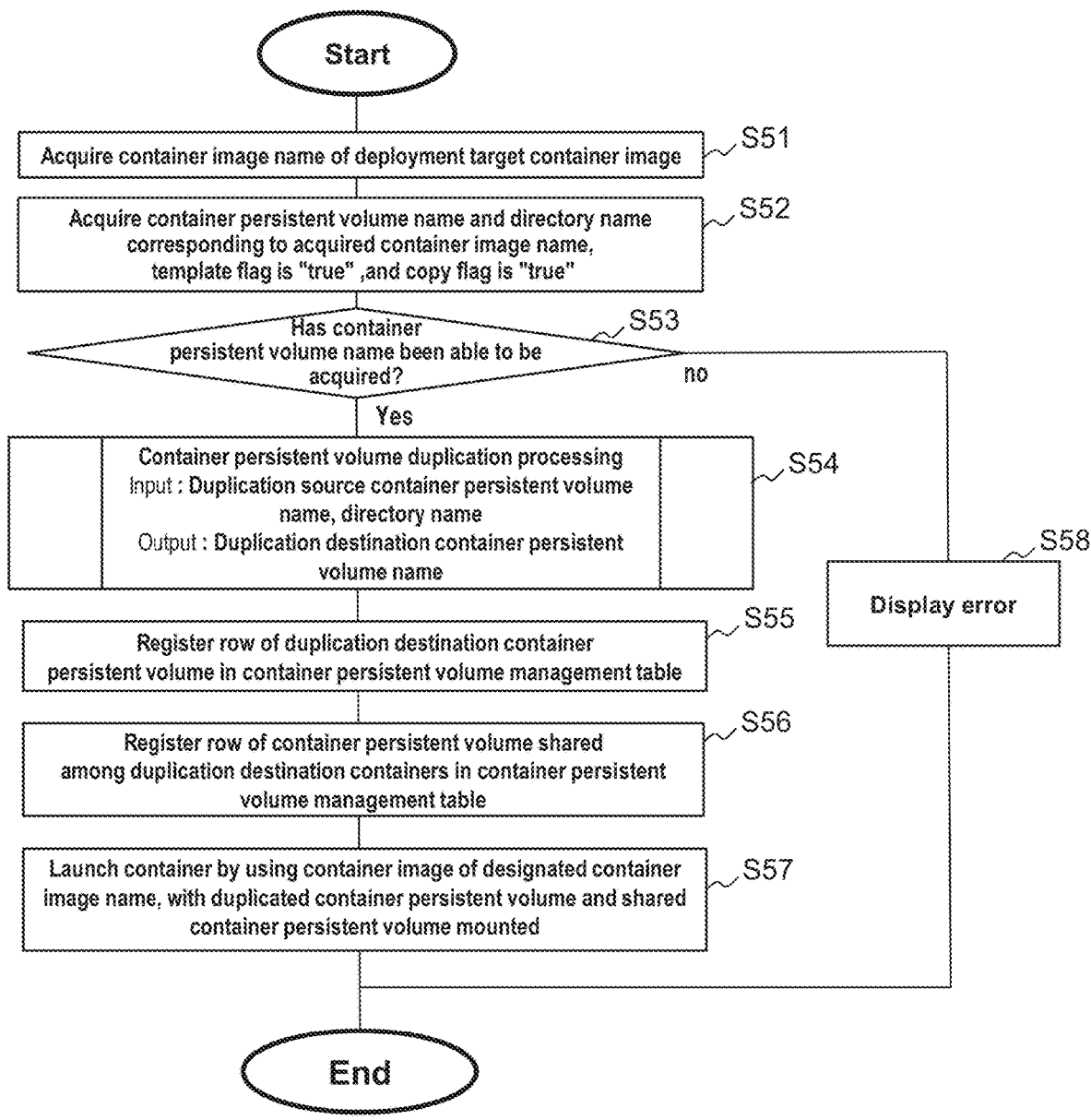
FIG. 14 is a flowchart of first duplication destination container deployment processing according to the embodiment.

FIG. 14 is a flowchart of the first duplication destination container deployment processing according to the embodiment. FIG. 15 is a diagram for explaining states of the various types of tables in the first duplication destination container deployment processing according to the embodiment.

The first duplication destination container deployment processing is processing for deploying a duplication destination container, based on a container image name of a container image (a container image of a duplication source container (a first container)) for creating the duplication destination container (a second container) to be deployed. The first duplication destination container deployment processing is implemented by the processor 31 executing the duplication destination container deployment program 66. The first duplication destination container deployment processing is performed, for example, when the processor 31 receives from the client computer 10 a command for container deployment including a container image name of a container image to be used to deploy a duplication destination container.

When the processor 31 executing the duplication destination container deployment program 66 receives a command for container deployment (a duplication command), the processor 31 acquires from the command a container image name of a container image to be used to deploy a duplication destination container (step S51). Subsequently, the processor 31 acquires a container persistent volume name and a directory name from the container persistent volume management table 63, using as keys the acquired container image name, the template flag set to "true", and the copy flag set to "true" (step S52). A container persistent volume corresponding to the container persistent volume name acquired through step S52 is a volume to be duplicated in order to be mounted to a duplication destination container. In step S52, for example, a row indicated by thick frames in FIG. 15(A) is specified, and a container persistent volume name (a duplication target) and a directory name are acquired.

Subsequently, the processor 31 determines whether or not a container persistent volume name has been able to be acquired in step S52 (step S53). If a container persistent volume name has been able to be acquired (step S53: yes), the processor 31 performs container persistent volume duplication processing for duplicating a container persistent volume (see FIG. 18) (step S54). Note that in the duplication destination persistent volume duplication processing, the processor 31 inputs the acquired container persistent volume name and directory name, and receives a name of a duplication destination container persistent volume (a duplication destination container persistent volume name) as an output. When this container persistent volume duplication processing is performed, in the storage apparatus 50, a corresponding container persistent volume is duplicated, and the duplicated container persistent volume is registered in the storage volume management table 64 as shown in FIG. 15(B).

Subsequently, the processor 31 adds a row corresponding to the duplication destination container persistent volume to the container persistent volume management table 63 (step S55). More specifically, the processor 31 adds to the persistent volume management table 63 a row in which the acquired duplication destination container persistent volume name, a duplication destination container name, the acquired directory name, and a set value of the copy flag (which is same as a set value of the copy flag in a row corresponding to the duplication source container persistent volume) are configured. Note that the processor 31 configures the container image name 63e to be blank and the template flag 63f to be "false" in the row. In step S55, a third row is added to the container persistent volume management table 63 as shown in FIG. 15(C).

Subsequently, the processor 31 adds a row corresponding to a container persistent volume shared among duplication destination containers to the container persistent volume management table 63 (step S56). Here, a row that can be obtained from the container persistent volume management table 63 by using as keys the acquired container image name, the template flag set to "true", and the copy flag set to "false" is a row relevant to a container persistent volume for a duplication source container, and the container persistent volume corresponding to this row is shared among duplication destination containers. In step S56, a row corresponding to the same container persistent volume for the duplication destination container concerned is added. The added row includes the contents of the row relevant to the container persistent volume for the duplication source container, among which the container name is changed to a duplication destination container name, the container image name is made blank, and the template flag is changed to "false". In step S56, a fourth row is added to the container persistent volume management table 63 as shown in FIG. 15(D).

Subsequently, the processor 31 launches the duplication destination container by using a container image corresponding to the designated container image name, with the duplicated container persistent volume and the shared container persistent volume mounted (step S57), and terminates the processing.

Note that in step S53, if a container persistent volume name has not been able to be acquired (step S53: no), the processor 31 causes the display of the client computer 10 or the host computer 30 concerned to display an error message (step S58). For example, the error message may be as follows: "Designated container image name cannot be identified."

According to the above-described processing, it is possible to deploy a duplication destination container to which if a container persistent volume needs to be duplicated, a duplicated volume is mounted, and if a container persistent volume can be shared, that sharable container persistent volume is mounted.

Next, second duplication destination container deployment processing will be described.

Figure 16:
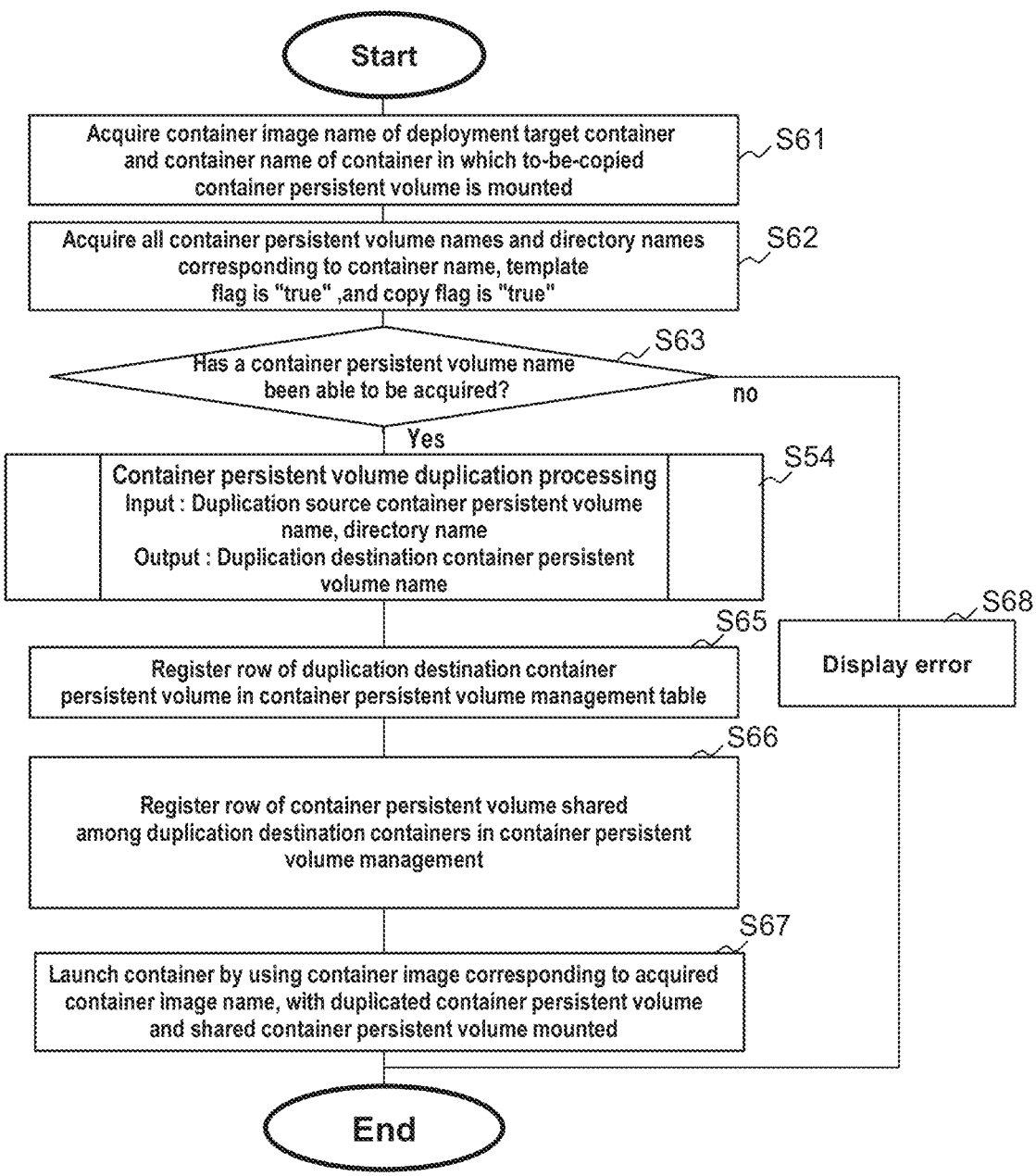
FIG. 16 is a flowchart of second duplication destination container deployment processing according to the embodiment.

FIG. 16 is a flowchart of the second duplication destination container deployment processing according to the embodiment. FIG. 17 is a diagram for explaining states of the various types of tables in the second duplication destination container deployment processing according to the embodiment.

The second duplication destination container deployment processing is processing for deploying a duplication destination container based on a container image name of a container image for creating the duplication destination container to be deployed, and on a container name of a container (a container name of a duplication source container) to which a to-be-copied container persistent volume is mounted. The second duplication destination container deployment processing is implemented by the processor 31 executing the duplication destination container deployment program 66. The second duplication destination container deployment processing is performed, for example, when the processor 31 receives from the client computer 10 a command for container deployment including a container image name of a container image to be used to deploy a duplication destination container and a container name of a container to which a to-be-copied container persistent volume is mounted.

When the processor 31 executing the duplication destination container deployment program 66 receives a command for container deployment (a duplication command), the processor 31 acquires from the command a container image name of a container image to be used to deploy a duplication destination container, and a container name of a container to which a to-be-copied container persistent volume is mounted (step S61). Subsequently, the processor 31 acquires all combinations of a container persistent volume name and a directory name from the container persistent volume management table 63, using as keys the acquired container name, the template flag set to "true", and the copy flag set to "true" (step S62). Container persistent volumes corresponding to the container persistent volume names acquired through step S62 are volumes to be duplicated in order to be mounted to the duplication destination container. In step S62, for example, a row designated by thick frames in FIG. 17(A) are specified, and a container persistent volume name (a duplication target) and a directory name are acquired.

Subsequently, the processor 31 determines whether or not a container persistent volume name has been able to be acquired in step S62 (step S63). If a container persistent volume name has been able to be acquired (step S63: yes), the processor 31 performs container persistent volume duplication processing for duplicating a container persistent volume (see FIG. 18) (step S54). Note that in the duplication destination persistent volume duplication processing, the processor 31 inputs the acquired container persistent volume name and one directory name, and receives a name of a duplication destination container persistent volume (a duplication destination container persistent volume name) as an output. When this container persistent volume duplication processing is performed, in the storage apparatus 50, a corresponding container persistent volume is duplicated, and the duplicated container persistent volume is registered in the storage volume management table 64 as shown in FIG. 17(B).

Subsequently, the processor 31 adds a row corresponding to the duplication destination container persistent volume to the container persistent volume management table 63 (step S65). More specifically, the processor 31 adds to the container persistent volume management table 63 a row in which the acquired duplication destination container persistent volume name, the duplication destination container name, the acquired directory name, and a set value of the copy flag (which is same as a set value of the copy flag in a row corresponding to the duplication source container persistent volume) are configured. Note that the processor 31 configures the container image name 63e to be blank and the template flag 63f to be "false" in the row. In step S65, a third row is added to the container persistent volume management table 63 as shown in FIG. 17(C).

Subsequently, the processor 31 adds a row corresponding to a container persistent volume to be shared among duplication destination containers to the container persistent volume management table 63 (step S66). Here, a row that can be obtained from the container persistent volume management table 63 by using as keys the acquired container name, the template flag set to "true", and the copy flag set to "false" is a row relevant to the container persistent volume for the duplication source container, and the container persistent volume corresponding to this row is shared among duplication destination containers. In step S66, a row corresponding to the same container persistent volume for the duplication destination container concerned is added. The added row includes the contents of the line relevant to the container persistent volume for the duplication source container, among which the container name is changed to the duplication destination container name concerned, the container image name is make blank, and the template flag is changed to "false". In step S66, a fourth row is added to the container persistent volume management table 63 as shown in FIG. 17(D).

Subsequently, the processor 31 launches the duplication destination container by using a container image corresponding to the designated container image name, with the duplicated container persistent volume and the shared container persistent volume mounted (step S67), and terminates the processing.

Note that in step S63, if a container persistent volume name has not been able to be acquired (step S63: no), the processor 31 causes the display of the client computer 10 or host computer 30 concerned to display an error message (step S68). For example, the error message may be as follows: "Designated container image name cannot be identified."

According to the above-described processing, it is possible to deploy a duplication destination container in which if a container persistent volume needs to be duplicated, a duplicated volume is mounted, and if a container persistent volume can be shared, that sharable container persistent volume is mounted.

Next, the container persistent volume duplication processing will be described in detail.

Figure 18:
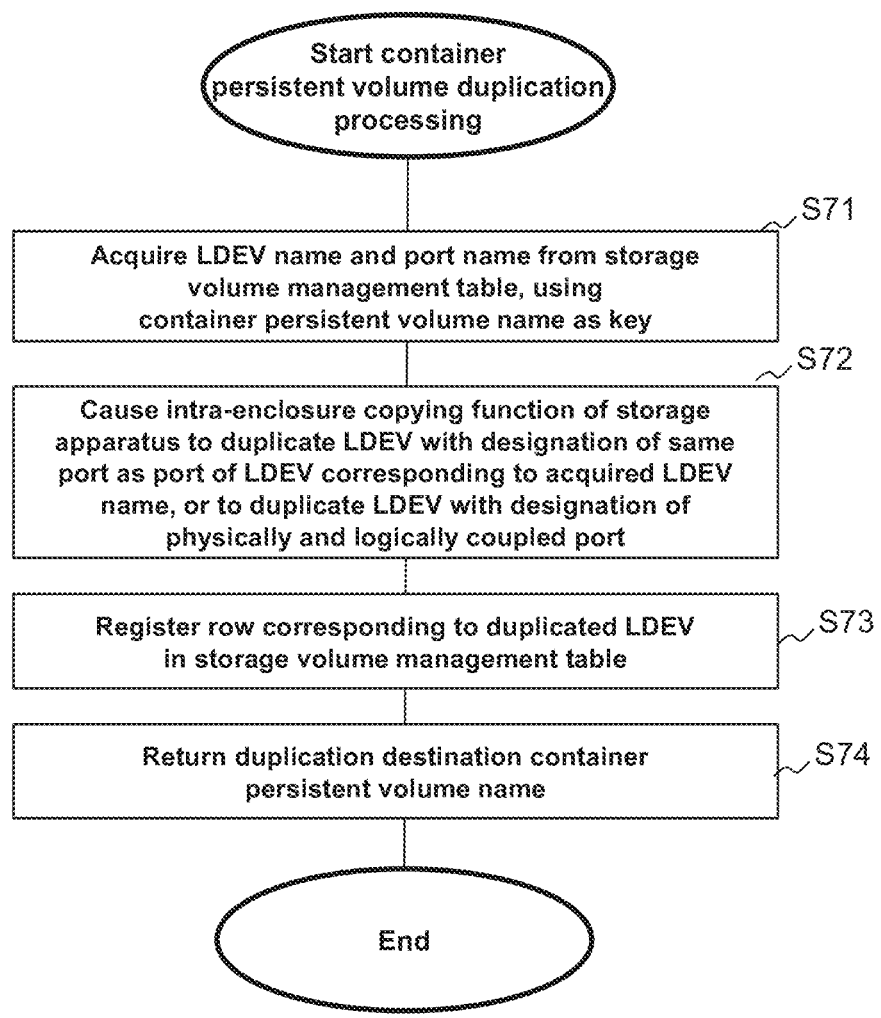
FIG. 18 is a flowchart of container persistent volume duplication processing according to the embodiment.

FIG. 18 is a flowchart of the container persistent volume duplication processing according to the embodiment.

The container persistent volume duplication processing is processing corresponding to step S54 in FIGS. 14 and 16, and is implemented by the processor 31 executing the container persistent volume duplication program 69.

The processor 31, using an inputted container persistent volume name as a key, acquires a LDEV name of a LDEV in the storage apparatus 50 corresponding to a container persistent volume concerned, and a port name for the LDEV from the storage volume management table 64 (step S71).

Subsequently, the processor 31 causes the storage apparatus 50 to perform LDEV duplication with designation of the acquired port name for the LDEV (step S72), and proceeds the processing to step S73. Note that in the designation of a port, a logically and physically connected port may be used to create a volume.

In step S73, the processor 31 adds a row corresponding to the duplicated LDEV to the storage volume management table 64 (step S73). Note that in the container persistent volume name 64b in the added row, a container persistent volume name that is automatically generated by the processor 31 in accordance with a predetermined standard is configured.

Subsequently, the processor 31 returns the generated container persistent volume name (step S74), and terminates the processing.

Next, container-deletion-time volume release processing will be described.

Figure 19:
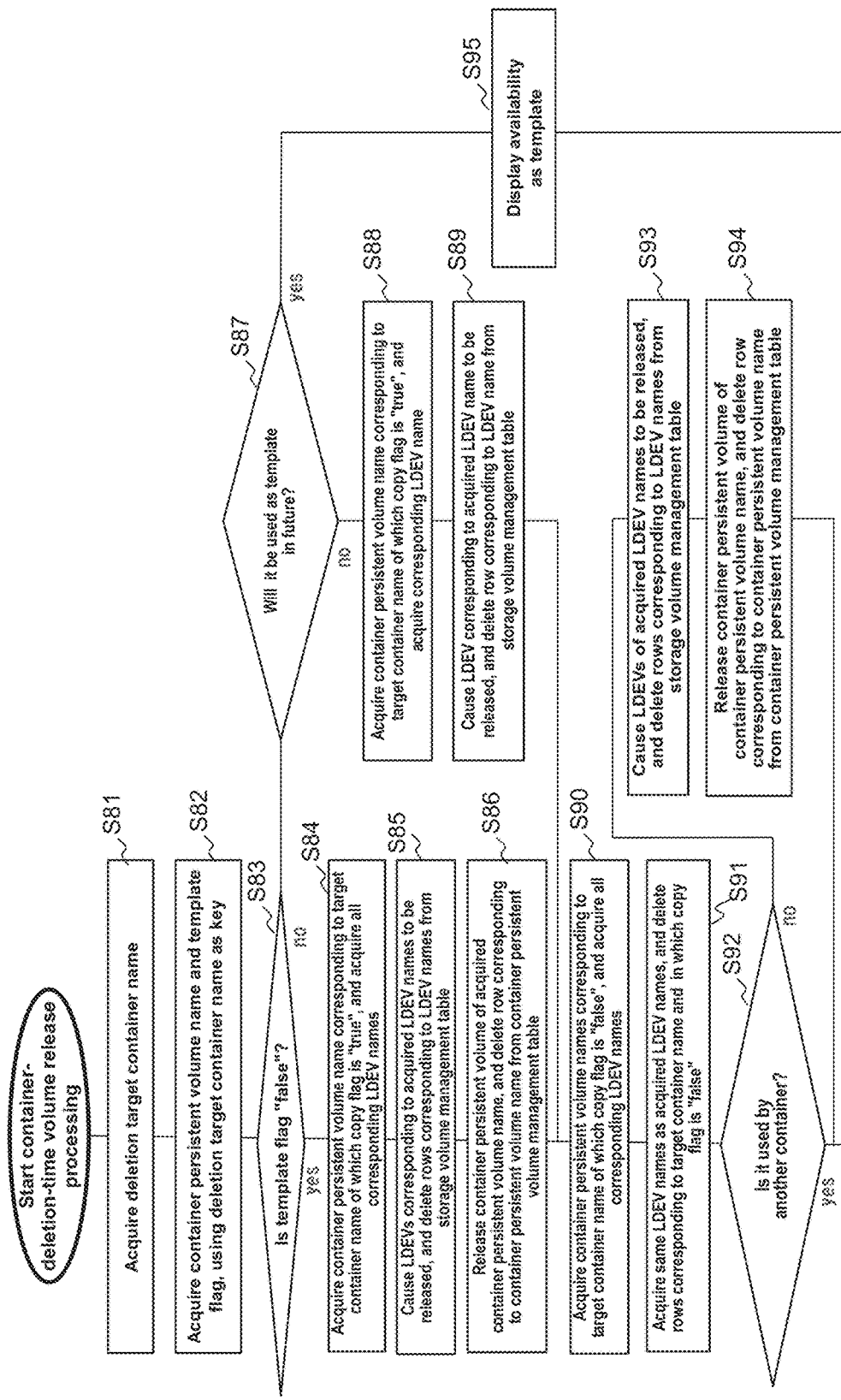
FIG. 19 is a flowchart of container-deletion-time volume release processing according to the embodiment.

FIG. 19 is a flowchart of the container-deletion-time volume release processing according to the embodiment.

The container-deletion-time volume release processing is implemented by the processor 31 executing the container-deletion-time volume release program 67. The container-deletion-time volume release processing is performed when the processor 31 receives a container deletion command including a deletion target container name from the client computer 10.

The processor 31 executing the container-deletion-time volume release program 67 acquires a container name of a deletion target container (referred to as the target container) (referred to as the target container name) from the container deletion command received from the client computer 10 (step S81).

Subsequently, the processor 31, using the container name as a key, acquires a container persistent volume name and a set value of the template flag from the container persistent volume management table 63 (step S82).

Subsequently, the processor 31 determines whether or not the acquired set value of the template flag is "false" (step S83).

As a result, if the set value of the template flag is "false" (step S83: yes), since it means that a container image of this container is unavailable as a template, the processor 31 acquires from the container persistent volume management table 63 container persistent volume names in all rows corresponding to the target container name in which the set value of the copy flag is "true", and acquires all LDEV names corresponding to the acquired container persistent volume names from the storage volume management table 64 (step S84).

Subsequently, the processor 31 causes the storage apparatus 50 to release all LDEVs corresponding to the acquired LDEV names, and deletes all rows corresponding to the acquired LDEV names from the storage volume management table 64 (step S85).

Subsequently the processor 31 releases (deletes) container persistent volumes corresponding to the container persistent volume names acquired in step S84, deletes rows corresponding to the acquired container persistent volume names from the container persistent volume management table 63 (step S86), and proceeds the processing to step S90.

On the other hand, if the set value of the template flag is not "false" (step S83: no), the processor 31 determines whether or not the container image of the deletion target container and the relevant container persistent volume will be used as a template in future (step S87). Here, for example, the processor 31 may cause the display of the client computer 10 to display a following message: "This container is registered as a template. Do you acknowledge to delete the container including the container persistent volume so that the container persistent volume will not be used as a template in future?" Then, the processor 31 may receive from a user of the client computer 10, as a response to the message, a designation as to whether or not the container persistent volume will be used as a template in future.

As a result, when it is determined that the container persistent volume will not be used as a template in future (step S87: no), the processor 31 acquires from the container persistent volume management table 63 container persistent volume names in all rows corresponding to the target container name in which the set value of the copy flag is "true", and acquires from the storage volume management table 64 all LDEV names corresponding to the acquired container persistent volume names (step S88).

Subsequently, the processor 31 causes the storage apparatus 50 to release all LDEVs corresponding to the acquired LDEV names, deletes all rows corresponding to the acquired LDEV names from the storage volume management table 64 (step S89), and proceeds the processing to step S90.

In step S90, the processor 31 acquires from the container persistent volume management table 63 container persistent volume names in all rows corresponding to the target container name in which the set value of the copy flag is "false", and acquires from the storage volume management table 64 all LDEV names corresponding to the acquired container persistent volume names.

Subsequently, the processor 31 acquires same LDEV names as the LDEV names acquired in step S90, and deletes all the rows corresponding to the target container name in which the set value of the copy flag is "false" from the container persistent volume management table 63 (step S91).

Subsequently, the processor 31 determines whether or not container persistent volumes corresponding to the container persistent volume names acquired in step S90 are used by other containers (step S92). More specifically, the processor 31 determines whether or not a container persistent volume corresponding to anyone of the acquired container persistent volume names is used by another container, depending on whether or not a row relevant to another container in which the acquired container persistent volume name is configured exists in the container persistent volume management table 63.

As a result, if it is determined that a container persistent volume corresponding to the acquired container persistent volume name is used by another container (step S92: yes), since it means that the container persistent volume is used by the other container, the processor 31 proceeds the processing to step S96, without deleting the container persistent volume.

On the other hand, if it is determined that a container persistent volume corresponding to the acquired container persistent volume name is not used by another container (step S92: no), the processor 31 causes the storage apparatus 50 to releases all LDEVs corresponding to the acquired LDEV names, and deletes all rows corresponding to the acquired LDEV names from the storage volume management table 64 (step S93).

Subsequently, the processor 31 releases (deletes) the container persistent volumes corresponding to the acquired container persistent volume name, deletes rows corresponding to the acquired container persistent volume name from the container persistent volume management table 63 (step S94), and proceeds the processing to step S96. Thus, a container persistent volume that is not used by another container can be appropriately released.

On the other hand, in step S87, if it is determined that the container persistent volume will be used as a template in future (step S87: yes), the processor 31 causes the display of the client computer 10 to display a template available message indicating that the container image of the target container and the relevant container persistent volume can be used as a template in future (step S95), and proceeds the processing to step S96. Note that the template available message may be as follows: "Only the container is deleted without deleting the container persistent volume. The container persistent volume can be used as a template in future."

In step S96, the processor 31 deletes the target container and terminates the processing.

According to the above-described container-deletion-time volume release processing, when deleting a container, a container persistent volume that will not be used due to the deletion of the container can be appropriately deleted.

Note that the present invention is not limited to the above-described embodiment, but can be made with appropriate modifications, within the scope not departing from the gist of the present invention.

For example, in the above-described embodiment, steps S10 and S11 are performed upon receiving two commands as shown in FIG. 7, whereby a container persistent volume is created and a container to which the container persistent volume is attached is launched. However, the present invention is not limited to this configuration. For example, the processing for creating a container persistent volume and launching a container to which the container persistent volume is attached may be performed by receiving a single command. For example, the command may be configured as shown in the following (3).

-docker run-v (to-be-created volume name): (container mount destination)-driver=(driver name)-opt capa=(volume capacity) (designated container image name)   (3)

Thus, with a single command, it can be facilitated to create a container persistent volume and to launch a container to which the container persistent volume is attached.

Moreover, in the above-described embodiment, a volume is illustrated as an example of a hardware resource used by a container. However, the present invention is not limited to such a hardware resource. For example, a hardware resource may be a port.

What is claimed is:

1. A container management apparatus that manages a container built on an operating system, comprising:
a processor unit configured to, based on a container image of a first container, duplicate a second container, and to configure a hardware resource used by the first container such that the hardware resource can also be used by the second container; and
a storage unit which stores container resource information in which the container image of the first container and the hardware resource used by the first container is associated;
wherein the processor unit is configured to, when duplicating the second container based on the container image of the first container, duplicate the hardware resource associated with the container image of the first container, and configure the duplicated hardware resource such that the duplicated hardware resource can be used by the second container;
wherein the hardware resource includes a volume used by the first container, and the processor unit is configured to
duplicate the volume;
receive from a user a deletion command to delete a container;
determine whether or not the container corresponding to the deletion command is the first container; and
when the container corresponding to the deletion command is the first container, delete the container, without deleting the container resource information relevant to the first container from the storage unit.

2. The container management apparatus according to claim 1, wherein the volume is a volume in which data of a database is stored.

3. The container management apparatus according to claim 1, wherein the container resource information includes duplication permission/non-permission information indicating whether or not to duplicate the volume, and
the processor unit is configured to determine whether or not to duplicate the volume, based on the duplication permission/non-permission information.

4. The container management apparatus according to claim 3, wherein when the duplication permission/non-permission information indicates not to duplicate the volume, the processor unit is configured to configure the volume such that the second container can directly use the volume, without duplicating the volume.

5. The container management apparatus according to claim 1, wherein the processor unit is configured to
receive from a user a duplication command designating duplication of the second container based on the first container, and
when receiving the duplication command, duplicate the second container and perform a series of processes for configuring the hardware resource such that the hardware resource can be used.

6. The container management apparatus according to claim 1, wherein the processor unit is configured
when the container corresponding to the deletion command is the first container, to receive from the user an instruction as to whether or not the container image of the first container will be used as a template, and
when the instruction from the user indicates that the container image of the first container will be used as a template, not to delete the container resource information from the storage unit, but when the instruction indicates that the container image of the first container will not be used as a template, to delete the container resource information from the storage unit.

7. The container management apparatus according to claim 1, wherein the processor unit is configured to
determine whether or not the container corresponding to the deletion command is the second container, and
when the container corresponding to the deletion command is the second container, delete the container and also delete the duplicated volume that has been created by duplicating the hardware resource associated with the container image of the first container and has been used.

8. A container management method by a container management apparatus that manages a container built on an operating system, comprising:
duplicating a second container based on a container image of a first container;
configuring a hardware resource used by the first container such that the hardware resource can also be used by the second container;
storing container resource information in which the container image of the first container and the hardware resource used by the first container is associated;
when duplicating the second container based on the container image of the first container, duplicating the hardware resource associated with the container image of the first container, and configuring the duplicated hardware resource such that the duplicated hardware resource can be used by the second container, wherein the hardware resource includes a volume used by the first container;
duplicating the volume;
receiving from a user a deletion command to delete a container;
determining whether or not the container corresponding to the deletion command is the first container; and
when the container corresponding to the deletion command is the first container, deleting the container, without deleting the container resource information relevant to the first container from the storage unit.

9. The container management method according to claim 8, wherein the volume is a volume in which data of a database is stored.

10. The container management method according to claim 8, wherein the container resource information includes duplication permission/non-permission information indicating whether or not to duplicate the volume, and the method further comprises:
determining whether or not to duplicate the volume, based on the duplication permission/non-permission information.

11. The container management method according to claim 10, wherein when the duplication permission/non-permission information indicates not to duplicate the volume, and the method further comprise configuring the volume such that the second container can directly use the volume, without duplicating the volume.

12. The container management method according to claim 8, further comprising:
receiving from a user a duplication command designating duplication of the second container based on the first container, and
when receiving the duplication command, duplicating the second container and perform a series of processes for configuring the hardware resource such that the hardware resource can be used.

13. The container management method according to claim 8, further comprising:
when the container corresponding to the deletion command is the first container, receiving from the user an instruction as to whether or not the container image of the first container will be used as a template, and
when the instruction from the user indicates that the container image of the first container will be used as a template, not deleting the container resource information from the storage unit, but when the instruction indicates that the container image of the first container will not be used as a template, deleting the container resource information from the storage unit.

14. The container management method according to claim 8, further comprising:
determining whether or not the container corresponding to the deletion command is the second container, and
when the container corresponding to the deletion command is the second container, deleting the container and also deleting the duplicated volume that has been created by duplicating the hardware resource associated with the container image of the first container and has been used.

15. A computer-readable nonvolatile recording medium storing a container management program to be executed by a computer constituting a container management apparatus that manages a container built on an operating system,
wherein the container management program causes the computer to:
duplicate a second container based on a container image of a first container;
configure a hardware resource used by the first container such that the hardware resource can also be used by the second container;
store container resource information in which the container image of the first container and the hardware resource used by the first container is associated;
when duplicating the second container based on the container image of the first container, duplicate the hardware resource associated with the container image of the first container, and configure the duplicated hardware resource such that the duplicated hardware resource can be used by the second container, wherein the hardware resource includes a volume used by the first container;
duplicate the volume;
receive from a user a deletion command to delete a container;
determine whether or not the container corresponding to the deletion command is the first container; and
when the container corresponding to the deletion command is the first container, delete the container, without deleting the container resource information relevant to the first container from the storage unit.

16. The computer-readable nonvolatile recording medium according to claim 15, wherein the container resource information includes duplication permission/non-permission information indicating whether or not to duplicate the volume, and wherein the container management program causes the computer to determine whether or not to duplicate the volume, based on the duplication permission/non-permission information.

17. The computer-readable nonvolatile recording medium according to claim 16, wherein when the duplication permission/non-permission information indicates not to duplicate the volume, the container management program causes the computer to configure the volume such that the second container can directly use the volume, without duplicating the volume.

18. The computer-readable nonvolatile recording medium according to claim 15, wherein the container management program causes the computer to:
receive from a user a duplication command designating duplication of the second container based on the first container, and when receiving the duplication command, duplicate the second container and perform a series of processes for configuring the hardware resource such that the hardware resource can be used.

19. The computer-readable nonvolatile recording medium according to claim 15, wherein the container management program causes the computer:

when the container corresponding to the deletion command is the first container, to receive from the user an instruction as to whether or not the container image of the first container will be used as a template, and when the instruction from the user indicates that the container image of the first container will be used as a template, not to delete the container resource information from the storage unit, but when the instruction indicates that the container image of the first container will not be used as a template, to delete the container resource information from the storage unit.

20. The computer-readable nonvolatile recording medium according to claim 15, wherein the container management program causes the computer to:

determine whether or not the container corresponding to the deletion command is the second container, and when the container corresponding to the deletion command is the second container, delete the container and also delete the duplicated volume that has been created by duplicating the hardware resource associated with the container image of the first container and has been used.

* * * * *